United States Patent
Yang

(10) Patent No.: US 6,457,358 B1
(45) Date of Patent: Oct. 1, 2002

(54) TUBULAR CORIOLIS FORCE DRIVEN PIEZOELECTRIC GYROSCOPE SYSTEM, AND METHOD OF USE

(75) Inventor: Jiashi Yang, Lincoln, NE (US)

(73) Assignee: Board of Regents of the University of Nebraska, Lincoln, NE (US)

( * ) Notice: Subject to any disclaimer, the term of this patent is extended or adjusted under 35 U.S.C. 154(b) by 95 days.

(21) Appl. No.: 09/659,624

(22) Filed: Sep. 11, 2000

Related U.S. Application Data

(63) Continuation-in-part of application No. 09/271,791, filed on Mar. 18, 1999, now Pat. No. 6,140,748.

(51) Int. Cl.$^7$ .............. G01P 9/04; H01L 41/08
(52) U.S. Cl. .............. 73/504.13; 73/504.16; 310/369; 310/370
(58) Field of Search ............ 73/504.02, 504.04, 73/504.12, 504.13, 504.14, 504.15, 504.16; 310/365, 366, 367, 369, 370

(56) References Cited

U.S. PATENT DOCUMENTS

| | | | |
|---|---|---|---|
| 3,141,100 A | | 7/1964 | Hart |
| 3,143,889 A | | 8/1964 | Simmons et al. |
| 3,258,617 A | | 6/1966 | Hart |
| 3,736,446 A | | 5/1973 | Berlincourt et al. ........... 310/8 |
| 4,253,036 A | | 2/1981 | Kizaki .................... 310/361 |
| 4,628,734 A | | 12/1986 | Watson ...................... 73/505 |
| 5,117,148 A | * | 5/1992 | Nakamura et al. ........ 73/504.12 |
| 5,323,082 A | * | 6/1994 | Wright .................... 310/366 |
| 5,336,960 A | * | 8/1994 | Shimizu et al. ............. 310/366 |
| 5,434,467 A | * | 7/1995 | Abe et al. ................ 73/504.12 |
| 5,471,785 A | * | 12/1995 | Sato et al. ................ 73/504.13 |
| 5,495,760 A | | 3/1996 | Wirt ........................ 73/504.13 |
| 5,504,384 A | | 4/1996 | Lee et al. ................... 310/359 |
| 5,691,595 A | | 11/1997 | Tomikawa et al. ........... 310/370 |
| 5,747,914 A | | 5/1998 | Huang et al. ............... 310/318 |
| 5,751,093 A | * | 5/1998 | Nakamura ................... 310/369 |
| 5,767,405 A | | 6/1998 | Bernstein et al. ......... 73/504.16 |
| 5,817,940 A | * | 10/1998 | Kobayashi et al. ....... 73/504.13 |
| 5,837,895 A | | 11/1998 | Fujimoto .................. 73/504.12 |
| 5,847,487 A | | 12/1998 | Maeno ....................... 310/321 |
| 5,850,119 A | * | 12/1998 | Ebara et al. ................. 310/366 |
| 5,854,427 A | | 12/1998 | Terada et al. ............. 73/504.16 |
| 5,874,674 A | | 2/1999 | Kasanami et al. ......... 73/504.14 |
| 5,912,524 A | | 6/1999 | Ohnishi et al. .............. 310/321 |
| 5,912,528 A | | 6/1999 | Kamada ..................... 310/353 |
| 5,942,839 A | | 8/1999 | Ohnishi et al. .............. 310/359 |
| 5,945,600 A | | 8/1999 | Touge et al. .............. 73/504.14 |
| 6,018,997 A | | 2/2000 | Kumada et al. .......... 73/504.16 |

OTHER PUBLICATIONS

"Piezoelectric–Ceramic Cylinder Vibratory Gyroscope", by Abe et al., Jpn. J. Appl. Phys., vol. 31, (1992).

"Consideration On Equivalent Mechanical Circuits For Vibratory Gyroscope", by Kudo et al., IEEE Ultrasonic Symo., (1990).

(List continued on next page.)

Primary Examiner—Helen Kwok
(74) Attorney, Agent, or Firm—James D. Welch

(57) ABSTRACT

Disclosed is a piezoelectric gyroscope which presents as a generally elongated tubular shape having inner and outer radially polarized annular region defining surfaces, with an inner electrode on the inner surface, and four outer electrodes present on the outer surface. The four electrodes present on the outer surface are oriented such that each is in a separate quadrant, (as the piezoelectric gyroscope generally longitudinally elongated essentially tubular structure is viewed in cross-section), and ideally at substantially ninety degree intervals on the outer surface. In use the piezoelectric gyroscope system is caused to rotate about an essentially centrally located longitudinally oriented axis while a flex inducing driving voltage is applied across two of the four electrodes, (driving) electrodes, which are oriented at substantially 180 degrees with respect to one another, while an output voltage is sensed across the other two (sensing), electrodes. Also disclosed are a tuning-fork shaped variations.

9 Claims, 1 Drawing Sheet

OTHER PUBLICATIONS

"Piezoelectric Vibratory Gyroscope Using Flexural Vibration Of A Triangular Bar", by Fujishima et al., IEEE Forth–Fifth Annual Symp. on Freq. Control, (1991).

"Mathematical Theory Of The Fork–Type Wave Gyroscope", IEEE International Frequency Control Symposium, (1995).

"$LiTaO_3$ Crystal Fork Vibratory Gyroscope" by Wakatsuki et al., IEEE Ultrasonics Symposium, (1994).

"Finite Element Analysis Of Single Crystal Tuning Forks For Gyroscopes", by Kudo et al., IEEE Intl. Freq. Control Symp., (1996).

"A Cylindrical Shell Piezoelectric Gyroscope", Yang, Intl. J. of App. Electromagnetics and Mechanics, 8, 259–271, (1997).

"The Dynamics Of A Thin Film Piezoelectric Cylinder Gyroscope", Burdess, Proc. Inst. Mech. Engrs. 200 (C4), 271–280 (1986).

Excerpt from a book titled "Smart Structures and Methods", Artech House, (1996) is disclosed as it gives insight to the Polling process for polarizing ceramics.

* cited by examiner

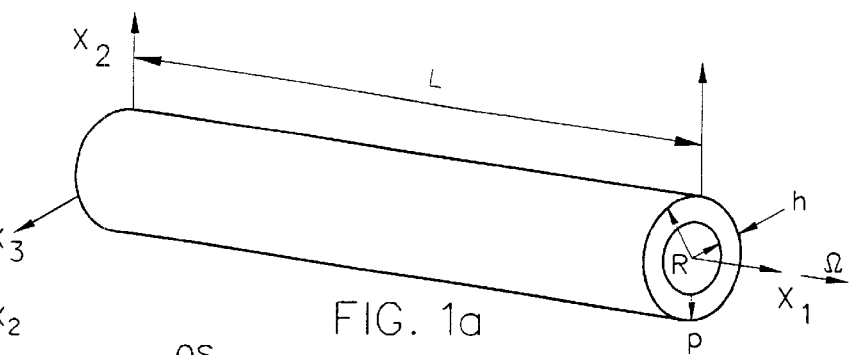
FIG. 1a
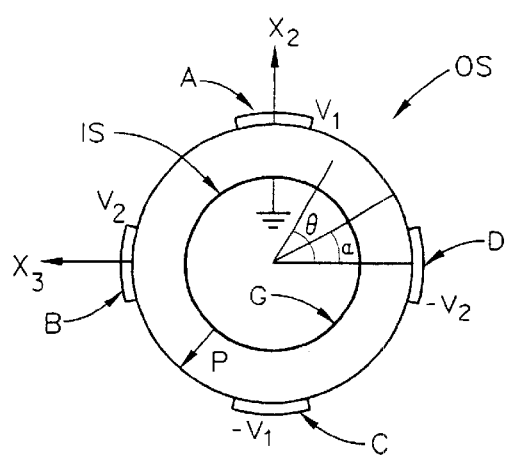
FIG. 1b
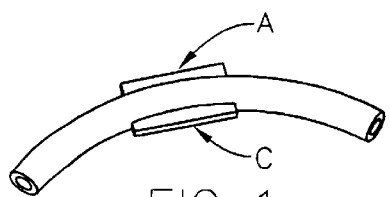
FIG. 1c
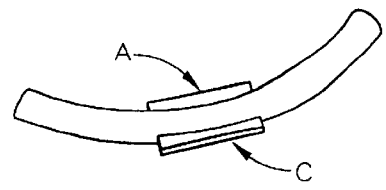
FIG. 1d
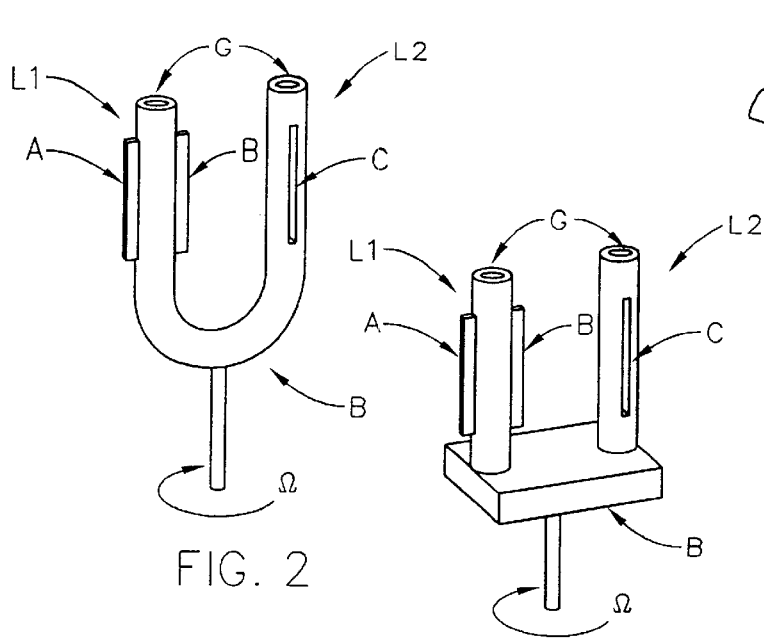
FIG. 2
FIG. 3

TUBULAR CORIOLIS FORCE DRIVEN PIEZOELECTRIC GYROSCOPE SYSTEM, AND METHOD OF USE

This Application is a CIP of Application, Ser. No. 09/271,791 filed Mar. 18, 1999 now U.S. Pat. No. 6,140,748.

TECHNICAL FIELD

The present invention relates to piezoelectric systems, and more particularly to a generally tubular shaped, coriolis force drive, piezoelectric gyroscope system, and method of its use. The primary embodiment of said present invention system is of a generally elongated tubular shape having inner and outer radially polarized annular region defining surfaces, with an inner electrode present on the inner surface thereof, and four electrodes on the outer surface, said four electrodes on the outer surface ideally being oriented at substantially ninety degree intervals. In use said system is caused to rotate about an essentially centrally located longitudinally oriented axis while a flex inducing driving voltage is applied across two of said four electrodes which are oriented substantially 180 degrees with respect to one another, while an output voltage which is related to the rotation rate is sensed across the other two electrodes.

BACKGROUND

Piezoelectric gyroscopes are well known in the art. For instance, generally elongated rectangular solid shaped Piezoelectric gyroscopes which serve to produce a voltage at sensing electrodes thereof which is proportional to an angular rotation velocity of said piezoelectric-gyroscope about a longitudinally oriented axis therethrough are known, in which the mechanism of operation involves Coriolis force mediated flexure in a direction which is perpendicular to both said longitudinal axis, and a direction of an applied driving voltage effected flex.

One known embodiment of a piezoelectric gyroscope, as viewed in front elevational cross-section, typically has, at one longitudinally disposed side thereof, two vertically stacked, (ie. one atop the other), regions of vertically oriented polarized direction material sandwiched between driving voltage electrodes attached thereto at upper and lower surfaces. One of said vertically stacked regions of vertically oriented polarized direction material has an upward polarized direction and the other a downward polarized direction. On an opposite longitudinally disposed side thereof, and as viewed in side elevation there are present two adjacent regions of horizontally oriented polarized direction material, (ie. one in front of the other as viewed in frontal elevation), sandwiched between sensing voltage electrodes attached thereto at front and back vertically oriented surfaces. One said adjacent region of horizontally oriented polarized direction material having, as viewed from atop thereof, a horizontal laterally to the right projecting polarized and the other said adjacent region of horizontally oriented polarized direction material having a horizontal laterally to the left oriented polarized direction. That is, the polarized plane and polarized directions on said second longitudinally disposed side are simply rotated ninety (90) degrees, (eg. horizontally oriented), from the plane of the polarized directions, (eg. vertically oriented), on said first laterally disposed side about said longitudinally oriented axis therethrough.

Another prior art embodiment of a piezoelectric gyroscope is comprised of a long solid but flexible elongated rod with piezoelectric ceramics affixed thereto on side faces thereof. Said long solid but flexible rod can be triangular or rectangular in cross-section and have three or four electrodes mounted on side faces thereof. Where only three electrodes are present, both driving and sensing circuits share on of the electrodes. References which describe such piezoelectric gyroscope systems are, respectively:

"Vibrating Angular Rate Sensor May Threaten The Gyroscope", Gates, Electronics, 41, 103–134 (1968); and "Piezoelectric Vibratory Gyroscope Using Flexural Vibration Of A Triangular Bar", Fujishima et al., IEEE 45th Annual Symp. On Frequency Control, 261–265 (1991).

Another prior art embodiment of a piezoelectric gyroscope is comprised of a solid but flexible, long, circular cross-section, piezoelectric elongated rod, with multiple electrodes affixed on the outer surface thereof. Such an embodiment is described in U.S. Pat. No. 5,336,960 to Fujishima et al., which is titled "Gyroscope Using Circular Rod Type Piezoelectric Vibrator".

Another prior art embodiment of a piezoelectric gyroscope is comprised of a short flexible tubular shaped element, to an outer surface of which are affixed numerous piezoelectric ceramics. Application of driving voltage across some electrodes thereof cause a shape change from essentially circular cross-section toward essentially elliptical cross-section, which shape change, in combination with rotation effected Coriolis force, causes an output voltage to appear at other of said electrodes. Such a gyroscopic system is described in "The Dynamics Of A Thin Film Piezoelectric Cylinder Gyroscope", Burdess, Proc. Inst. Mech. Engrs. 200 (C4), 271–280 (1986).

Yet another prior art embodiment of a piezoelectric gyroscope is described in an article by the inventor herein, titled "A Cylindrical Shell Piezoelectric Gyroscope", Yang, Intl. J. of App. Electromagnetics and Mechanics, 8, 259–271, (1997). Said article describes a short tubular shaped piezoelectric gyroscope system in which radial and torsional vibration modes are utilized to realize a rotation detecting system.

Disclosed in a related Application by the present Inventor, (Ser. No. 09/271,791), is a piezoelectric gyroscope system comprising a generally longitudinally elongated three dimensional mass of piezoelectric material having first and second longitudinally disposed sides, said piezoelectric gyroscope system being distinguished in that a sensing electrode is present at one terminal end thereof, said sensing electrode being affixed so that it is oriented other than on a longitudinally oriented side of said piezoelectric gyroscope. Typically, said terminal end of said present invention piezoelectric gyroscope system, whereat said sensing electrode is affixed, is accurately described as oriented in a direction perpendicular to the direction of longitudinal elongation, and the generally longitudinally elongated three dimensional mass of piezoelectric material is a selected to be of a rectangular solid shape. Said invention couples the voltage amplification benefits of piezoelectric (Rosen) transformers to the angular velocity measuring capabilities of piezoelectric-gyroscopes, by placing a sensing electrode in a piezoelectric- gyroscope much as is done in piezoelectric-transformers, (eg. as viewed in elevation, at a vertically oriented end of a longitudinally disposed side of a present invention piezoelectric-gyroscope at which is present two regions of horizontally longitudinally oriented polarized direction material). That is, the two sensing electrodes in a conventional piezoelectric-gyroscope, described above as adjacent to regions of horizontally, laterally oriented polarized direction material, (ie. one in front of the other as viewed in frontal elevation), sandwiched between sensing voltage electrodes attached thereto at front and back surfaces, are, in the preferred embodiment of the present invention, replaced by a single electrode at a vertically oriented end of the longitudinally disposed side of the present invention piezoelectric-gyroscope at which is present the two adjacent regions of horizontally longitudinally oriented polarized direction material. Said single electrode can reference to one of the driving electrodes, or to a second sensing electrode. A preferred embodiment of said related invention Piezoelectric Gyroscope, which serves to couple the voltage amplification benefits of piezoelectric (Rosen) transformers to the angular velocity measuring capabilities of conventional piezoelectric gyroscopes, can be described as comprising a generally elongated, typically rectangular solid shaped block of piezoelectric material having first and second longitudinally disposed sides and a longitudinally oriented axis which projects essentially centrally therethrough from said first longitudinally disposed side to said second longitudinally disposed side thereof. At the first longitudinally disposed side thereof there are present two, vertically stacked, regions of oppositely oriented polarized direction material sandwiched between driving voltage electrodes. One of said vertically stacked regions of oppositely oriented polarized direction material has, for instance, an "upward" polarized direction and the other a "downward" polarized direction. And on the second longitudinally disposed side thereof there are two adjacent regions of oppositely oriented polarized direction material, one said adjacent region of oppositely oriented polarized direction material having, for instance, a longitudinally "to the right" projecting polarized and the other said adjacent region of oriented polarized direction material having a longitudinally "to the left" oriented polarized direction. The plane of the polarized directions on said second longitudinally disposed side is rotated ninety (90) degrees from the plane of the polarized directions on said first longitudinally disposed side. Said piezoelectric-gyroscope further has a sensing electrode present at a vertically oriented end of the second longitudinally disposed side of the present invention piezoelectric-gyroscope.

Generally, in use Piezoelectric gyroscopes are caused to rotate at an angular rotation velocity about a typically longitudinally oriented axis, which projects essentially centrally therethrough from said first longitudinally disposed side to said second longitudinally disposed side, and a flex effecting voltage is applied across the driving electrodes while an output voltage is sensed across said sensing electrodes. When both angular rotation velocity about said longitudinally oriented axis therethrough, and flex effecting voltage is present across the driving electrodes, it occurs that, (through the mechanism of Coriolis force), a voltage appears at the sensing electrodes which is related to said angular rotation velocity about said longitudinally oriented axis therethrough. Where the angular rotational velocity about said longitudinally oriented axis therethrough is at least an order of magnitude less than is the natural vibrational frequency of the piezoelectric gyroscope material, the output voltage at the sensing electrodes is typically directly proportional to said angular rotational velocity.

It is also known that materials which are well suited for use in Piezoelectric-transformers and gyroscopes are ceramics in which can be effected regions of poled direction by a "Poling procedure". Ceramics are inherently isotropic so that polarization can be determined by application of an electric field across the materials in excess of the coercive field thereof, (which is typically on the order of 1 MV/m), while raising the temperature of the material above the Curie point, and then cooling the material below this point to lock-in the induced domain structure. A reference which describes this procedure is titled "Smart Structures and Materials", Culshaw, Artech House, (1996).

A with an eye to the present invention a search of Patents was conducted, with the result being that nothing obviating of the present invention system was identified. The most relevant were:

A Patent to Wirt, U.S. Pat. No. 5,495,760 describes a gyroscope with one or more drive cylinders which have single electrodes on the inside and on the outside diameters.

A Patent to Kumada, U.S. Pat. No. 5,912,528 describes a vibrating gyroscope which includes a ring-shaped vibrator having a node.

A Patent to Kananami et al., U.S. Pat. No. 5,874,674 describes a piezoelectric vibratory gyroscope having non-parallel sides.

Additional known Patents which describe angular or rotation measuring systems comprised of piezoelectric material are:

U.S. Pat. No. 3,143,889 to Simmons et al., which provides for electrodes to be present on a piezoelectric material on top and bottom surfaces and on front and back surfaces.

U.S. Pat. No. 3,258,617 to Hart describes a piezoelectric system which positions sensing electrodes, (see (23) and (24) of FIG. 2 therein), at both the ends of a preferably rectangular shaped mass of piezoelectric material.

U.S. Pat. No. 3,141,100 to Hart describes a rather complex system comprised of a plurality of crystal quartz elements.

U.S. Pat. No. 5,837,895 describes a vibrating gyroscope including a piezoelectric substrate having two divided electrodes on one main surface, and a single electrode on the other main surface.

U.S. Pat. No. 5,942,839 describes a piezoelectric vibratory gyroscope having three parallel vibrator arms.

U.S. Pat. No. 5,912,524 to Ohnishi et al. describes a vibratory gyroscope.

U.S. Pat. No. 5,847,487 to Maeno describes a cross-shaped vibration gyroscope.

U.S. Pat. No. 5,945,600 to Touge et al., describes an angular rate detector.

U.S. Pat. No. 5,767,405 to Bernstein et al., describes a tuning fork gyroscope.

U.S. Pat. No. 5,691,595 to Tomikawa et al., describes a vibratory gyroscope including a planar elastic vibrator having vibrator piezoelectric material layers on the front and back sides.

Additionally:

U.S. Pat. No. 3,736,446 to Berlincourt et al., describes a piezoelectric transformer with an electrode (17) at an end of a preferably rectangular shaped mass of piezoelectric material. This Patent also shows a system structure with various regions of polarized direction material present therein. Reference to FIG. 1 therein shows two regions (13) and (14) of oppositely directed vertical polarized at the leftmost side thereof as viewed in said FIG. 1, and with a region of horizontally polarized material at the right side (12) as so viewed.

U.S. Pat. No. 5,504,384 to Lee et al., shows another piezoelectric transformer with electrodes (11) and (12) at ends of an essentially rectangular shaped block of piezoelectric material. Also described are various regions of polarized material present therein. Reference to FIG. 2 in said 384 Patent shows horizontally oppositely directed regions of piezoelectric material at laterally disposed ends of the essentially rectangular shaped block of piezoelectric material, with oppositely directed vertically poled regions of piezoelectric material centrally located therewithin.

Articles which describe conventional Piezoelectric transformers and gyroscope are:

A paper titled "Piezoelectric-Ceramic Cylinder Vibratory Gyroscope", by Îbe et al., Jpn. J. Appl. Phys., Vol. 31, (1992), describes a piezoelectric gyroscope with a cylindrical structure.

Another paper titled "Consideration On Equivalent Mechanical Circuits For Vibratory Gyroscope", by Kudo et al., IEEE Ultrasonics Symp., (1990) described equations of gyro-motion and proposes many vibratory gyroscopes including one utilizing rotation motion in a double resonate vibrator system.

Another paper titled "Piezoelectric Vibratory Gyroscope Using Flexural Vibration Of A Triangular Bar", by Fujishima et al., IEEE Forth-Fifth Annual Symp. on Freq. Control. (1991), describes basic principals of a piezoelectric vibratory gyroscope and discloses development of a unique triangular bar flexural vibratory piezoelectric gyroscope.

A paper titled "Mathematical Theory Of The Fork-Type Wave Gyroscope", Ulitko, IEEE International Frequency Control Symposium, (1995) describes operation of Fork-type gyroscopes.

Another paper which describes Fork-type Vibratory Gyroscopes is titled "LiTaO$_3$ Crystal Fork Vibratory Gyroscope" by Wakatsuki et al., IEEE Ultrasonics Symposium, (1994).

Another paper titled "Finite Element Analysis Of A Quartz Angular Rate Sensor", ANSYS Conference Proceedings, 3.35–48, (1989) is further cited as is a paper titled "Finite Element Analysis Of Single Crystal Tuning Forks For Gyroscopes", by Kudo et al., IEEE Intl. Freq. Control Symp., (1996), describes the results of applying finite element analysis to tuning fork gyroscopes.

Even in view of the identified known prior art, there remains need for new piezoelectric gyroscope systems which provide angular velocity measuring capacity.

DISCLOSURE OF THE INVENTION

In a very broad sense, the present invention can be described as a piezoelectric gyroscope system comprising a generally longitudinally elongated essentially tubular structure presenting with inner and outer annular region defining surfaces and first and second longitudinally disposed ends, said piezoelectric gyroscope system being distinguished in that:

a. an electrode is present on the inner surface thereof, and b. in that there are present four electrodes on the outer surface thereof spaced at substantially ninety degree intervals, and c. In that said generally longitudinally elongated essentially tubular structure, the annular region thereof of which is made of piezoelectric material which is radially polarized.

Note that the electrode which is present on the inner surface of the present invention piezoelectric gyroscope system is present to functionally serve as a second plate with respect to driving electrodes, (see electrodes A & C in FIG. 1a), and sensing electrodes, (see electrodes B & D in FIG. 1a. Said electrode is typically present on substantially the entire inner surface, which is to be interpreted based upon said functional purpose of said "inner electrode". Functionally, said inner electrode can be primarily present only directly opposed to said driving and sensing electrodes.

It is noted that the four electrodes on the outer surface thereof can alternatively be described as each being present in a separate quadrant, (as the piezoelectric gyroscope generally longitudinally elongated essentially tubular structure is viewed in cross-section), with at least the two "driving electrodes" thereof being substantially oriented at substantially 180 degrees with respect to one another. The sensing electrodes are, however, also preferably oriented at substantially 180 degrees with respect to one another to optimize sensed voltage magnitude.

In use said piezoelectric gyroscope is caused to rotate at an angular rotation velocity about said longitudinally oriented axis which projects essentially centrally therethrough from said first longitudinally disposed end to said second longitudinally disposed end, and a flex effecting voltage is applied across two electrodes oriented at substantially 180 degrees with respect to one another, (ie. driving electrodes) while an output voltage is sensed at the other two electrodes, (ie. sensing electrodes). The end result is that when both:

angular rotation velocity about said longitudinally oriented axis which projects essentially centrally therethrough from said first longitudinally disposed end to said second longitudinally disposed end, and flex effecting voltage is applied across the driving electrodes, it occurs that, through the mechanism of Coriolis force, another flex perpendicular to the voltage effected flex occurs and is related to said angular rotation velocity about said longitudinally oriented axis therethrough, appears across the two sensing electrodes which are oriented such that the "axis" thereof, (ie. the direction through the sensing electrodes and perpendicular thereto), is substantially perpendicular to both the axis of rotation and the "axis" of the driving electrodes.

It is also disclosed that the preferred piezoelectric material from which the generally longitudinally elongated essentially tubular structure is made is ceramic, because, as alluded to in the Background Section of this Disclosure, ceramic is inherently isotropic and it is relatively easy to induce polarized regions therein. However, use of any functional material is to be considered within the scope of the present invention, with another very relevant candidate being, for instance, lithium niobate.

A method of monitoring an angular rotation velocity comprises the steps of:

a. providing a present invention piezoelectric gyroscope as just described;

said method further comprising in a functional order the steps of:

b. causing said piezoelectric gyroscope to rotate about a longitudinally oriented axis which projects essentially centrally therethrough from said first longitudinally disposed end to said second longitudinally disposed end and applying a flex effecting voltage across two electrodes oriented at substantially 180 degrees with respect to one another, (ie. driving electrodes), such that an output voltage is developed at the other two electrodes, (ie. driving electrodes);

c. monitoring said developed output voltage at said other two electrodes, (ie. sensing electrodes), said monitored output voltage being related to said angular velocity of rotation about said longitudinally oriented axis which projects essentially centrally therethrough from said first longitudinally disposed end to said second longitudinally disposed end.

The present invention also includes a tuning-fork shaped piezoelectric gyroscope system comprising an essentially tubular structure made of piezoelectric material presenting with inner and outer annular region defining surfaces, first and second legs thereof being projected from a base, preferably formed from a substantially "U" shape tubular structure, said piezoelectric gyroscope system being distinguished in that:

an electrode is present on the inner surface thereof, and in that there are present two electrodes on the outer surface of each leg, said two electrodes being positioned at substantially 180 degrees to one another and such that an axis through the electrodes on one leg is oriented essentially 90 degrees to an axis through the electrodes on the other leg, and in that said tubular structure annular region piezoelectric material is substantially radially polarized;

such that causing said piezoelectric gyroscope to rotate about said base and applying a flex effecting voltage across two "driving" electrodes oriented at substantially 180 degrees with respect to one another on one leg causes an output voltage to develop which can be sensed at the two "sensing" electrodes on the other leg.

A method of monitoring an angular rotation velocity comprises the steps of:

a. providing a present invention tuning-fork shaped piezoelectric gyroscope system as just described;

said method further comprising in a functional order the steps of:

b. causing said piezoelectric gyroscope to rotate about said base point and applying a flex effecting voltage across two electrodes on one leg thereof which are oriented at substantially 180 degrees with respect to one another, (ie. driving electrodes), such that an output voltage is developed at the two electrodes, (ie. driving electrodes), on the second leg thereof.

c. monitoring an output voltage at said two electrodes, (ie. sensing electrodes), on said second leg, said monitored output voltage being related to said angular velocity of rotation about said longitudinally oriented axis which projects essentially centrally therethrough from said first longitudinally disposed end to said second longitudinally disposed end.

The present invention will be better appreciated, by reference to the Detailed Description Section of this Disclosure, with appropriate reference to the accompanying Drawings.

SUMMARY OF THE INVENTION

It is therefore a primary purpose and/or objective of the present invention to teach a piezoelectric gyroscope, and method of its use, said piezoelectric gyroscope comprising a generally longitudinally elongated essentially tubular structure presenting with inner and outer annular region defining surfaces, and first and second longitudinally disposed ends, said piezoelectric gyroscope system being distinguished in that:

an electrode is present over the inner surface thereof, and in that there are present four outer electrodes on the outer surface thereof, each being present in a separate quadrant, (as the piezoelectric gyroscope generally longitudinally elongated essentially tubular structure is viewed in cross-section), with at least the two "driving electrodes" thereof being substantially oriented at substantially 180 degrees with respect to one another, and in that said generally longitudinally elongated essentially tubular structure annular region is made from piezoelectric material, preferably ceramic, which is radially polarized.

It is a further objective and/or purpose to teach a tuning fork shaped piezoelectric gyroscope and method of its use, said tuning fork shaped piezoelectric gyroscope comprising an essentially tubular structure made of piezoelectric material presenting with inner and outer annular region defining surfaces, first and second legs thereof being projected from a base point, (preferably a "U" shaped base point), said piezoelectric gyroscope system being distinguished in that:

an electrode is present on the inner surface of said legs thereof, and in that there are present two electrodes on the outer surface of each leg, said two electrodes being positioned at substantially 180 degrees to one another and such that an axis through the electrodes on one leg is oriented essentially 90 degrees to an axis through the electrodes on the other leg, and in that said tubular structure annular region piezoelectric material is substantially radially polarized;

Other purposes and/or objectives of the present invention will become apparent form a reading of the Specification and Claims.

BRIEF DESCRIPTION OF THE DRAWINGS

FIG. 1a shows a long and thin annular region substantially circular tube made of ceramic which is polarized in the radial direction, which serves as the basic element of the present invention piezoelectric gyroscope.

FIG. 1b shows a cross-section of the long and thin annular region substantially circular tube shown in FIG. 1a, and the electrode configuration of the present invention piezoelectric gyroscope.

FIGS. 1c and 1d show the effects of applying an alternating voltage (+/− V) at two of the electrodes, (demonstrated as electrodes A & C).

FIG. 2 shows a tuning-fork shaped variation on the same basic invention.

FIG. 3 shows a modified tuning-fork shaped variation on the same basic invention.

DETAILED DESCRIPTION

To provide insight to the structure of the present invention, attention is now turned to FIGS. 1a and 1b. FIG. 1a shows a long and thin substantially circular, (in cross section), tube made of piezoelectric material which is polarized in the radial direction. By "long and thin" it is meant that $(L>>R>>h)$, where "L" is the length, "R" the radius and "h" the annular thickness of the tube. (Note that ">>" here indicates approximately an order of magnitude or more "larger than"). A cross-section of the long and thin substantially circular tube and electrode configuration of the present invention piezoelectric gyroscope is shown in FIG. 1b. Note that the inner surface (IS) of the long and thin annular region of the substantially circular tube is shown as having an electrode (G) thereupon which is demonstrated as grounded. The ground is to be interpreted only as indicating that a functional voltage level is fixed thereat. The outer surface (OS) of the long and thin annular region substantially circular tube has four electrodes A & C and B & D shown as present thereupon. In use an alternating voltage (+/- V) is applied at two of the electrodes, (demonstrated as electrodes A & C), and this causes the piezoelectric material under said electrodes to appropriately expand and contract, with the effects thereof being demonstrated by FIGS. 1c and 1d.

When the long and thin annular region of the substantially circular tube of piezoelectric material is polarized in the radial direction, and is caused to rotate about the axis direction (x1) shown in FIG. 1a, simultaneous with the application of the (+/-V1) at electrodes (A & C), then Coriolis force serves to couple the deflections shown in FIGS. 1c and 1d to a deflection which causes a piezoelectric flex generated voltage (+/-V2) to appear across electrodes (B & D). Said (+/-V2) is related to the angular rotation, shown as ($\Omega$) in FIG. 1a. Where rotational motion is absent, it is noted that the sensed voltage is zero, (ie. V2=0.0). Further, it is noted, where the angular rotational velocity ($\Omega$) about said longitudinally oriented axis (x1) is at least an order of magnitude less than is a natural vibrational frequency of the piezoelectric material of said piezoelectric gyroscope, the output voltage at the sensing electrodes is essentially directly proportional to said angular rotational velocity.

FIG. 2 shows a variation on the same basic invention. Note that it shows a tuning-fork shaped piezoelectric gyroscope system comprising an essentially tubular structure made of piezoelectric material presenting with inner and outer annular region defining surfaces and first (L1) and second (L2) legs projected in a substantially "U" shape from a common base point (B), said piezoelectric gyroscope system being distinguished in that:

- an electrode (G) is present on the inner surface thereof, and
- in that there are present two electrodes on the outer surface of each leg, said two electrodes being positioned at substantially 180 degrees to one another and such that an axis through the electrodes (A & C) on one leg is oriented essentially 90 degrees to an axis through the electrodes (C & D—not visible as its behind electrode C), on the other leg, and
- in that said tubular structure annular region piezoelectric material is substantially radially polarized;

such that causing said piezoelectric gyroscope to rotate about said base (B) and applying a flex effecting voltage across two "driving" electrodes (A & C) oriented at substantially 180 degrees with respect to one another on one leg (L1) causes an output voltage to develop which can be sensed at the two "sensing" electrodes (C & D) on the other leg (L2).

FIG. 3 shows a variation of the system shown in FIG. 2, in which two separate legs (L1) and (L2) project from a common base (B).

To further aid with understanding, mathematical equations of the present invention generally tubular shaped, coriolis force driven, piezoelectric gyroscope system are presented directly.

ONE DIMENSIONAL EQUATIONS FOR THE TUBE GYROSCOPE

To provide insight to analysis criteria for the present invention tubular gyroscope, considering flexural motions of a tube in the x2 and x3 directions with flexural displacements $u_2(x_1,t)$ and $u_3(x_1,t)$. The axial normal strain for a beam in the classical theory of bending is:

$$S_1 = -x_2 u_{2,11} - x_3 u_{3,11} \qquad 1$$

Note that $u_{2,11}$ and $u_{311}$ are bending curvatures in the x2 and x3 directions. The electric field corresponding to the electrode configuration in FIG. 1(b) can be written as $$E_r = \begin{cases} V_2/h, & -\alpha < \theta < \alpha, \\ -V_1/h, & \pi/2 - \alpha < \theta < \pi/2 + \alpha, \\ -V_2/h, & \pi - \alpha < \theta < \pi + \alpha, \\ V_1/h, & 3\pi/2 - \alpha < \theta < 3\pi/2\alpha. \end{cases} \qquad 2$$

For beams in bending, the dominating stress component is the axial stress component $T_1$. For the present invention tubular gyroscope, the main electric field component is $^E r$. At every point on the middle surface of the tube, we need a local coordinate system with the axial, azimuthal, and radial direction labeled as 1, 2 and 3. For ceramics poled in the radial direction we have the following material matrices;

$$\begin{pmatrix} s_{11} & s_{12} & s_{13} & 0 & 0 & 0 \\ s_{12} & s_{11} & s_{13} & 0 & 0 & 0 \\ s_{13} & s_{13} & s_{33} & 0 & 0 & 0 \\ 0 & 0 & 0 & s_{44} & 0 & 0 \\ 0 & 0 & 0 & 0 & s_{44} & 0 \\ 0 & 0 & 0 & 0 & 0 & s_{66} \end{pmatrix}, \begin{pmatrix} 0 & 0 & d_{31} \\ 0 & 0 & d_{31} \\ 0 & 0 & d_{33} \\ 0 & d_{15} & 0 \\ d_{15} & 0 & 0 \\ 0 & 0 & 0 \end{pmatrix}, \begin{pmatrix} \varepsilon_{11} & 0 & 0 \\ 0 & \varepsilon_{11} & 0 \\ 0 & 0 & \varepsilon_{33} \end{pmatrix}, \qquad 3$$

where $S_{66}=2)S_{11}-S_{12}$). then the main constitutive relations relevant are:

$$S_1 = s_{11} T_1 + d_{31} E_r,$$

$$D_4 = d_{31} T_1 + \epsilon_{33} E_r \qquad 4$$

From (4) $T_1$ and $D_r$ can be solved in terms of $S_1$ and $E_r$, with the result:

$$T_1 = s_{11}^{-1}(-x_2 u_{2,11} - x_3 u_{3,11}) \cdot s_{11}^{-1} d_{31} E_r \qquad 5_1$$

$$D_r = s_{11}^{-1} d_{31}(-x_2 u_{2,11} - x_3 u_{3,11}) + \bar{\epsilon}_{33} E_r \qquad 5_2$$

where (1) was used and where:

$$\bar{\epsilon}_{33} = \epsilon_{33}(1 - k_{31}^2), k_{31}^2 = d_{31}^2/(\epsilon_{33} s_{11}) \qquad 6$$

The bending moments corresponding to flexure in the x2 and x3 directions are defined by the following equations, which are integrated using the expression for $T_1$ in Eq. 5:

$$M_2 = \int_s x_2 T_1 dA = -EI u_{2,11} + s_{11}^{-1} d_{31} V_1 4R^2 \sin\alpha, \qquad 7_1$$

$$M_3 = \int_s x_3 T_1 dA = -EI u_{3,11} + s_{11}^{-1} d_{31} V_2 4R^2 \sin\alpha, \qquad 7_2$$

where $EI = s_{11}^{-1} \pi R^3 h$ ... Eqs. $7_1$ and $7_2$ show that bending in the x2 and x3 directions are coupled to $V_1$ and $V_2$ respectively. In terms of bending moments, the equations for classical flexure take the form of:

$$M_{2,11} = m(\ddot{u}_2 - 2\Omega \dot{u}_3 - \Omega^2 u_2) \qquad 8_1$$

$$M_{3,11} = m(\ddot{u}_3 + 2\Omega \dot{u}_2 - \Omega^2 u_3) \qquad 8_2$$

where Coriolis and centrifugal forces are included. In Eqs. $8_1$ and $8_2$ m=p2$\pi$Rh. The coordinate system is assumed to be rotating with the beam. In this co-rotating frame the beam undergoes small amplitude vibrations under the driving voltage $V_1$. The charge on the sensing electrode at B is given by:

$$Q_2 = -\int_0^L dx_1 \int_{\pi-a}^{\pi+a} D_r R d\theta \qquad (9)$$
$$= s_{11}^{-1} d_{31} 2R^2 \sin\alpha [u_{3,1}(L,t) - u_{3,1}(0,t)] + \bar{\varepsilon}_{33} V_2 h^{-1} 2R\alpha L,$$

where Eq. $5_2$ was used. It is noted that the sensing current depends on flexure in the x3 direction, but not on flexure in the x2 direction. The current flowing out of said electrode is:

$$I_2 = -\dot{Q}_2 \qquad (10)$$

In gyroscope applications the driving voltage $V_1$ is known and is time harmonic. The sensing electrodes at B and D are connected to the grounded reference electrode at the inner surface of the shell by an output circuit with impedance Z when the motion is time harmonic, with a proper connection so that either the sensing voltage or current is doubled. In the special cases where Z=0.0 or infinity, we have short or open output circuit conditions with $V_2$=0.0 or $I_2$=0.0. In general, neither $V_2$ or $I_2$ is known and we have the following circuit condition:

$$I_2 = V_2/Z \qquad (11)$$

Substituting Eqs. 7 into Eqs. 8, and noting that $V_1$ and $V_2$ are functions of time but do not depend on $x_1$, it can be written:

$$-EI u_{2,1111} = m(\ddot{u}_2 - 2\Omega \dot{u}_3 - \Omega^2 u_2) \qquad (12_1)$$

$$-EI u_{3,1111} = m(\ddot{u}_3 + 2\Omega \dot{u}_2 - \Omega^2 u_3) \qquad (12_2)$$

Boundary conditions are selected as those associated with a simply supported beam with:

$$u_2(0,t) = u_3(0,t) = u_2(L,t) = u_3(L,t) = 0 \qquad (13_1)$$

$$M_2(0,t) = M_3(0,t) = M_2(L,t) = M_3(L,t) = 0 \qquad (13_2)$$

Eqs. 13 are homogeneous, but the driving and sensing voltage will appear in Eq. $13_2$ through Eq. 7.

It can be summarized that two 4th order equations ($12_1$ and $12_2$) must be solved for time harmonic motions driven by $V_1$, which will lead to eight integration constants. $V_2$ is also unknown, however eight boundary conditions are provided by Eqs. $13_1$ and $13_2$, and a circuit condition is provided by Eq. 11.

ANALYSIS OF THE GYROSCOPE

Since the driving voltage is time harmonic, we use the complex notation:

$$\{V_1, V_2, Q_2, I_2\} = \{\bar{V}_1, \bar{V}_2, \bar{Q}_2, \bar{I}_2\} e^{i\omega t} \qquad (14)$$

For time harmonic motions, Eqs. $12_1$ and $12_2$ become linear differential equations with constant coefficients. The general solution can be readily found to be:

$$u_2(x_1, t) = \sum_{p=1}^{8} \gamma U^{(p)} e^{k^{(p)} x_1} e^{i\omega t}, \qquad (15_1)$$

$$u_3(x_1, t) = \sum_{p=1}^{8} \beta^{(p)} U^{(p)} e^{k^{(p)} x_1} e^{i\omega t}, \qquad (15_2)$$

where $U^{(p)}$ are undetermined constants, $k^{(p)}$ for p=1, 2, . . . 8 are the eight roots of the following equations for k $$k^4 = \frac{m}{EI}(\omega \pm \Omega)^2, \qquad (16)$$

and $$\gamma = 2im\omega\Omega, \beta^{(p)} = EI(k^{(p)})^4 - m(\omega^2 + \Omega^2) \qquad (17)$$

Substituting Eqs. 15 into Eqs. 8–10, expressions for $M_2$, $M_3$ and $I_2$ can be obtained. With application of boundary condition of Eqs. $13_1$ and $13_2$ yields nine linear equations for nine undetermined constants $U^{(p)}$ and $\bar{V}_2$.

(18)

$$\sum_{p=1}^{8} \gamma U^{(p)} = 0, \qquad (18_1)$$

$$\sum_{p=1}^{8} \beta^{(p)} U^{(p)} = 0, \qquad (18_2)$$

$$\sum_{p=1}^{8} \gamma e^{k^{(p)} L} U^{(p)} = 0, \qquad (18_3)$$

$$\sum_{p=1}^{8} \beta^{(p)} e^{k^{(p)} L} U^{(p)} = 0, \qquad (18_4)$$

$$\sum_{p=1}^{8} EI\gamma (k^{(p)})^2 U^{(p)} = s_{11}^{-1} d_{31} \bar{V}_1 4R^2 \sin\alpha, \qquad (18_5)$$

$$\sum_{p=1}^{8} EI\beta^{(p)} (k^{(p)})^2 U^{(p)} - s_{11}^{-1} d_{31} \bar{V}_2 4R^2 \sin\alpha = 0, \qquad (18_6)$$

$$\sum_{p=1}^{8} EI\gamma (k^{(p)})^2 e^{k^{(p)} L} U^{(p)} = s_{11}^{-1} d_{31} \bar{V}_1 4R^2 \sin\alpha, \qquad (18_7)$$

$$\sum_{p=1}^{8} EI\beta^{(p)} (k^{(p)})^2 e^{k^{(p)} L} U^{(p)} - s_{11}^{-1} d_{31} \bar{V}_2 4R^2 \sin\alpha = 0, \qquad (18_8)$$

$$\sum_{p=1}^{8} i\omega s_{11}^{-1} d_{31} 2R^2 (\sin\alpha) \beta^{(p)} k^{(p)} (e^{k^{(p)} L} - 1) U^{(p)} + \frac{1}{Z_2}\left(1 + \frac{Z_2}{Z}\right)\bar{V}_2 = 0, \qquad (18_9)$$

where:

$$Z_2 = \frac{1}{i\omega C_2}, \quad C_2 = \frac{\bar{\varepsilon}_{33} R 2\alpha L}{h}.$$

Equations 18 are driven by $\bar{V}_1$. In Eqs. $18_9$ the impedance in general is a function of ω. The specific form of this function depends on the structure of the output circuit joining the sensing electrodes.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

What is claimed is:

1. A piezoelectric gyroscope system comprising a generally longitudinally elongated essentially tubular structure made of piezoelectric material presenting with inner and outer annular region defining surfaces and first and second longitudinally disposed ends, said piezoelectric gyroscope system being distinguished in that:

an electrode is present on the inner surface thereof, and in that four electrodes are present on the outer surface thereof spaced at substantially ninety degree intervals, and in that the annular region of piezoelectric material of said generally longitudinally elongated essentially tubular structure is substantially radially polarized;

such that causing said piezoelectric gyroscope to rotate about a longitudinally oriented axis which projects essentially centrally therethrough from said first longitudinally disposed end to said second longitudinally disposed end and applying a flex effecting voltage across two "driving" electrodes oriented at substantially 180 degrees with respect to one another, while maintaining the electrode present on the inner surface at a constant potential, causes an output voltage which can be sensed at the other two "sensing" electrodes.

2. A piezoelectric gyroscope system as in claim 1, in which the piezoelectric material is selected from the group consisting of:

ceramic; and

LiTaO$_3$.

3. A method of monitoring an angular rotation velocity comprising the steps of:

a. providing a piezoelectric gyroscope system comprising a generally longitudinally elongated essentially tubular structure made of piezoelectric material presenting with inner and outer annular region defining surfaces and first and second longitudinally disposed ends, said piezoelectric gyroscope system being distinguished in that:

an electrode is present on the inner surface thereof, and in that four electrodes are present on the outer surface thereof spaced at substantially ninety degree intervals, and in that said annular region of piezoelectric material of said generally longitudinally elongated essentially tubular structure is radially polarized;

said method further comprising, while maintaining the electrode present on the inner surface at a constant potential, in a functional order the steps of:

b. causing said piezoelectric gyroscope to rotate about a longitudinally oriented axis which projects essentially centrally therethrough from said first longitudinally disposed end to said second longitudinally disposed end and applying a flex effecting voltage across two "driving" electrodes oriented at substantially 180 degrees with respect to one another, such that an output voltage is developed at the other two "sensing" electrodes;

c. monitoring said developed output voltage at the other two "sensing" electrodes, said monitored output voltage being related to said angular rotation velocity about said longitudinally oriented axis which projects essentially centrally therethrough from said first longitudinally disposed end to said second longitudinally disposed end.

4. A piezoelectric gyroscope system comprising a generally longitudinally elongated essentially tubular structure made of piezoelectric material presenting with inner and outer annular region defining surfaces and first and second longitudinally disposed ends, said piezoelectric gyroscope system being distinguished in that an electrode is present on the inner surface thereof, and in that four electrodes are present on the outer surface thereof, each of said four electrodes being present in a separate quadrant, with two thereof being oriented at substantially 180 degrees with respect to one another, and in that said annular region of piezoelectric material of said generally longitudinally elongated essentially tubular structure is substantially radially polarized;

such that causing said piezoelectric gyroscope to rotate about a longitudinally oriented axis which projects essentially centrally therethrough from said first longitudinally disposed end to said second longitudinally disposed end and applying a flex effecting voltage across two "driving" electrodes oriented at substantially 180 degrees with respect to one another, while maintaining the electrode present on the inner surface at a constant potential, causes an output voltage which can be sensed at the other two "sensing" electrodes.

5. A piezoelectric gyroscope system as in claim 4, in which the piezoelectric material is selected from the group consisting of:

ceramic; and

LiTaO$_3$.

6. A method of monitoring an angular rotation velocity comprising the steps of:

a. providing a piezoelectric gyroscope system comprising a generally longitudinally elongated essentially tubular structure made of piezoelectric material presenting with inner and outer annular region defining surfaces and first and second longitudinally disposed ends, said piezoelectric gyroscope system being distinguished in that:

an electrode is present on the inner surface thereof, and in that four electrodes are present on the outer surface thereof, each of said four electrodes being present in a separate quadrant, with two thereof being substantially oriented at substantially 180 degrees with respect to one another, and in that said annular region of piezoelectric material of said generally longitudinally elongated essentially tubular structure is substantially radially polarized;

said method further comprising, while maintaining the electrode present on the inner surface at a constant potential, in a functional order, the steps of:

b. causing said piezoelectric gyroscope to rotate about a longitudinally oriented axis which projects essentially centrally therethrough from said first longitudinally disposed end to said second longitudinally disposed end and applying a flex effecting voltage across two "driving" electrodes oriented at substantially 180 degrees with respect to one another, such that an output voltage is developed at the other two "sensing" electrodes;

c. monitoring said developed output voltage at the other two "sensing" electrodes, said monitored output voltage being related to said angular rotation velocity about said longitudinally oriented axis which projects essentially centrally therethrough from said first longitudinally disposed end to end second longitudinally disposed end.

7. A tuning-fork shaped piezoelectric gyroscope system comprising an essentially tubular structure made of piezoelectric material presenting with inner and outer annular region defining surfaces, first and second legs thereof being projected in a manner selected from the group consisting of:

as two legs projected in a substantially "U" shape from a common base point; and as two legs projecting from a common base;

said piezoelectric gyroscope system being distinguished in that:

an electrode is functionally present on the inner surface thereof, and in that two electrodes are present on the outer surface of each leg, said two electrodes being positioned at substantially 180 degrees to one another and such that an axis through the electrodes on one leg is oriented essentially 90 degrees to an axis through the electrodes on the other leg, and in that said annular region of piezoelectric material of said tubular structure is substantially radially polarized;

such that causing said piezoelectric gyroscope to rotate about said common base point or common base and applying a flex effecting voltage across two "driving" electrodes oriented at substantially 180 degrees with respect to one another on one leg, while maintaining the electrode present on the inner surface at a constant potential, causes an output voltage which can be sensed at the two "sensing" electrodes on the other leg.

8. A piezoelectric gyroscope system as in claim 7, in which the piezoelectric material is selected from the group, consisting of:

ceramic; and

LiTaO$_3$.

9. A method of monitoring an angular rotation velocity comprising the steps of:

a. providing a tuning-fork shaped piezoelectric gyroscope system comprising an essentially tubular structure made of piezoelectric material presenting with inner and outer annular region defining surfaces, first and second legs thereof being projected in a manner selected from the group consisting of:

as two legs projected in a substantially "U" shape from a common base point; and as two legs projecting from a common base;

said piezoelectric gyroscope system being distinguished in that:

an electrode is functionally present on the inner surface of said legs, and in that two electrodes are present on the outer surface of each leg, said two electrodes being positioned at substantially 180 degrees to one another and such that an axis through the electrodes on one leg is oriented essentially 90 degrees to an axis through the electrodes on the other leg, and in that said annular region of piezoelectric material of said tubular structure is substantially radially polarized;

such that causing said piezoelectric gyroscope to rotate about said common base point or common base and applying a flex effecting voltage across two "driving" electrodes oriented at substantially 180 degrees with respect to one another on one leg causes an output voltage which can be sensed at the two "sensing" electrodes on the other leg. said method further comprising, while maintaining the electrode present on the inner surfaces at a constant potential, in a functional order the steps of:

b. causing said piezoelectric gyroscope to rotate about said common base point or common base and applying a flex effecting voltage across two electrodes on one leg thereof which are oriented at substantially 180 degrees with respect to one another, such that an output voltage is developed at the two electrodes, on the second leg thereof;

c. monitoring an output voltage at said two electrodes, on said second leg, said monitored output voltage being related to said angular rotation velocity about said common base or common base point.

\* \* \* \* \*